US011481967B2

(12) United States Patent
Chajdas et al.

(10) Patent No.: US 11,481,967 B2
(45) Date of Patent: Oct. 25, 2022

(54) SHADER CORE INSTRUCTION TO INVOKE DEPTH CULLING

(71) Applicant: Advanced Micro Devices, Inc., Santa Clara, CA (US)

(72) Inventors: Matthäus G. Chajdas, Munich (DE); Christopher J. Brennan, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/007,935

(22) Filed: Aug. 31, 2020

(65) Prior Publication Data

US 2022/0068012 A1 Mar. 3, 2022

(51) Int. Cl.
*G06T 15/40* (2011.01)
*G06F 9/30* (2018.01)
*G06T 15/00* (2011.01)

(52) U.S. Cl.
CPC ........ *G06T 15/405* (2013.01); *G06F 9/30003* (2013.01); *G06T 15/005* (2013.01)

(58) Field of Classification Search
CPC combination set(s) only.
See application file for complete search history.

(56) References Cited

U.S. PATENT DOCUMENTS

| 5,729,672 | A | 3/1998 | Ashton | |
| 7,746,355 | B1* | 6/2010 | Cai | G06T 15/30 345/620 |
| 9,189,883 | B1 | 11/2015 | Hecht | |
| 10,636,201 | B2 | 4/2020 | Mitchell et al. | |
| 10,665,010 | B2 | 5/2020 | Hazel | |
| 10,679,405 | B2 | 6/2020 | Fursund et al. | |
| 10,692,270 | B2 | 6/2020 | Stanard et al. | |
| 10,789,675 | B2 | 9/2020 | Pohl | |
| 2014/0210819 | A1* | 7/2014 | Mei | G06T 15/005 345/423 |
| 2017/0287207 | A1* | 10/2017 | Clarberg | G06T 15/30 |

(Continued)

OTHER PUBLICATIONS

"General OpenGL—Per-Sample Processing—Scissor Test—Stencil Test—Depth Test—Early Fragment Test", Apr. 22, 2019, 31 pages, https://web.archive.org/web/20200930182637/https://www.khronos.org/opengl/wiki/General_OpenGL. [Retrieved Feb. 11, 2021].

(Continued)

*Primary Examiner* — Andrew G Yang
(74) *Attorney, Agent, or Firm* — Kowert Hood Munyon Rankin and Goetzel PC; Rory D. Rankin

(57) ABSTRACT

Systems, apparatuses, and methods for executing a shader core instruction to invoke depth culling are disclosed. A shader core executes an instruction to invoke a culling function on a depth culling unit for one or more entities prior to completing a corresponding draw call. The shader core provides a mode and coordinates to the depth culling unit as a result of executing the instruction. The depth culling unit implements the culling function to access a live depth buffer to determine whether one or more primitives corresponding to the entities are occluded. The culling unit returns indication(s) to the shader core regarding the result(s) of processing the one or more primitives. For example, if the results indicate a primitive is occluded, the shader core cancels the draw call for the primitive.

20 Claims, 7 Drawing Sheets

(56) References Cited

U.S. PATENT DOCUMENTS

| | | | |
|---|---|---|---|
| 2017/0337656 A1* | 11/2017 | Vembu | G06T 15/40 |
| 2018/0082464 A1 | 3/2018 | Akenine-Moller et al. | |
| 2018/0232912 A1* | 8/2018 | Nevraev | G06T 9/001 |
| 2018/0349315 A1 | 12/2018 | Heggelund et al. | |
| 2019/0066356 A1* | 2/2019 | Gierach | G06T 15/80 |
| 2019/0236829 A1* | 8/2019 | Hakura | G06T 15/005 |
| 2019/0295313 A1* | 9/2019 | Davies | G06T 15/40 |
| 2021/0001220 A1* | 1/2021 | Cerny | G06T 1/60 |
| 2021/0150797 A1 | 5/2021 | Tuomi et al. | |

OTHER PUBLICATIONS

Crow, "Shadow Algorithms for Computer Graphics", pp. 242-248, Siggraph '77, July 20-22 San Jose, California.

International Search Report and Written Opinion in International Application No. PCT/US2020/060490, dated Feb. 23, 2021, 17 pages.

Klehm, Oliver, "Interactive Massive Lighting for Virtual 3D City Models", Master's Thesis, Oct. 30, 2010, 85 pages, https://people.mpi-inf.mpg.de/~oklehm/publications/2010/master/massive_lighting_klehm10.pdf. [Retrieved Feb. 29, 2016].

Kolivand, et al., "Real-Time Shadow Using a Combination of Stencil and The Z-Buffer", The International Journal of Multimedia & Its Applications, vol. 3, No. 3, Aug. 2011.

Zhu et al., "Real-Time Rendering Framework in the Virtual Home Design System", Transactions on Edutainment IX, Jan. 2013, pp. 213-224.

International Search Report and Written Opinion in International Application No. PCT/US2021/047914, dated Feb. 11, 2022, 13 pages.

\* cited by examiner

SHADER CORE INSTRUCTION TO INVOKE DEPTH CULLING

BACKGROUND

Description of the Related Art

Graphics processors are often used within computer graphics processing systems to create computer-generated imagery from a geometric model. A geometric model defines various objects, details, lighting sources, and other elements of a virtual scene. The computing system determines how to render a given scene based on the geometric model and other inputs from a software application. These inputs include graphical objects such as points, lines, polygons, meshlets, three dimensional solid objects, and other objects. These objects can be referred to more generally as "primitives".

A graphics processing unit (GPU) or other type of processor processes the inputs and the geometric model to generate a two or three dimensional array of pixel color values that represent the desired image or video frame. Each pixel of a frame has multiple attributes associated with it, including a color and a texture. Typically, a shader is used to perform arithmetic and logical operations on the attributes of each pixel to achieve a final value that represents the pixel. A shader may be a program, fixed-function hardware, control logic, or any combination of these and/or other processing elements. The final value is placed into a frame buffer and is used when the pixel is driven to a display device.

When multiple primitives are rendered and projected to the same pixels on the screen, the rendering engine needs to determine which primitive is visible and which primitives are hidden. One technique for resolving occlusion issues involves performing a depth test with a depth buffer. For each pixel on the screen, a distance from the perspective of the viewpoint to the nearest object is stored in the depth buffer. When a primitive is projected to a given pixel of the screen space, a depth test is performed to determine if the rendered primitive is nearer to the screen (i.e., viewpoint) than the nearest previously rendered primitive. If the primitive is closer to the viewpoint than the previously rendered primitives, the primitive passes the test. Otherwise, if the primitive is further away from the viewpoint than any previously rendered primitive, the primitive fails the test. The viewpoint is defined by a virtual camera that represents a user's point of view or perspective.

While the following disclosure is directed to the above context, it should be understood that the methods and mechanisms described herein can also be used in other contexts to increase throughput, improve performance, reduce power consumption, and achieve other advantages.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for executing a shader core instruction to invoke depth culling are disclosed herein. In one implementation, a shader core executes an instruction to invoke a culling function on a depth culling unit for one or more entities (e.g., primitives, screen-space rectangle) prior to completing a corresponding draw call. The shader core provides a mode and coordinates to the depth culling unit as a result of executing the instruction. In one implementation, the depth culling unit implements the culling function to access a live depth buffer to determine whether one or more primitives are occluded. The culling unit returns indication(s) to the shader core regarding the result(s) of processing the one or more entities. In response to receiving the indication(s) regarding the culling function results(s), the shader core decides whether to modify, cancel, or continue with the draw call. For example, in one implementation, if the results from the culling unit indicate that a primitive is occluded, the shader core cancels the draw call for the primitive. Other types of actions can be taken by the shader core depending on the results generated by the culling unit. The graphics processing pipeline thus avoids any unnecessary processing tasks associated with the draw call, increasing the performance of the graphics processing pipeline.

Figure 1:
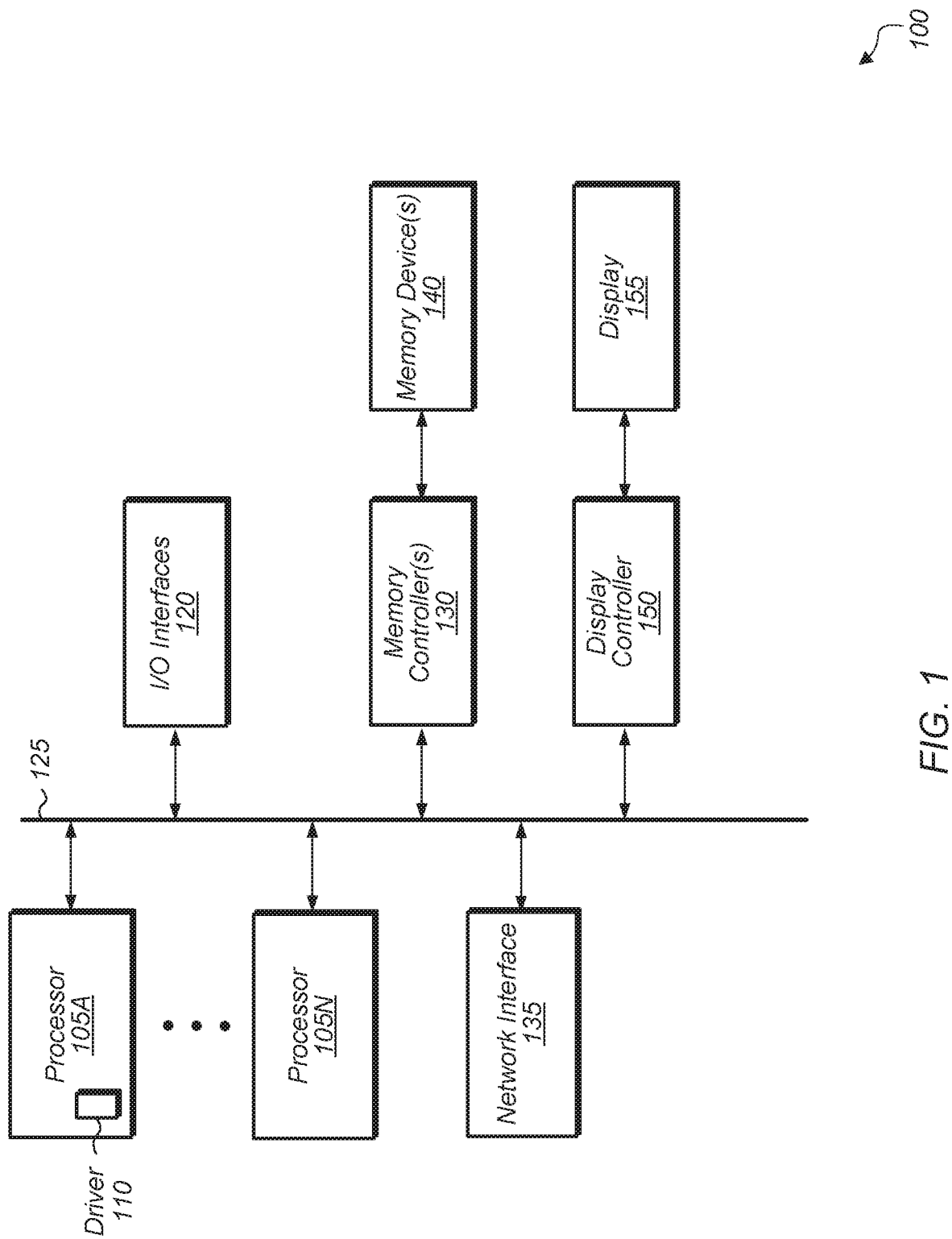
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, display controller 150, and display 155. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In this implementation, processor 105A executes a driver 110 (e.g., graphics driver) for communicating with and/or controlling the operation of one or more of the other processors in system 100. It is noted that depending on the implementation, driver 110 can be implemented using any suitable combination of hardware, software, and/or firmware. In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors. In one implementation, processor 105N is a GPU which provides pixels to display controller 150 to be driven to display 155.

Memory controller(s) 130 are representative of any number and type of memory controllers accessible by processors 105A-N. While memory controller(s) 130 are shown as being separate from processor 105A-N, it should be understood that this merely represents one possible implementation. In other implementations, a memory controller 130 can be embedded within one or more of processors 105A-N and/or a memory controller 130 can be located on the same semiconductor die as one or more of processors 105A-N. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is able to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
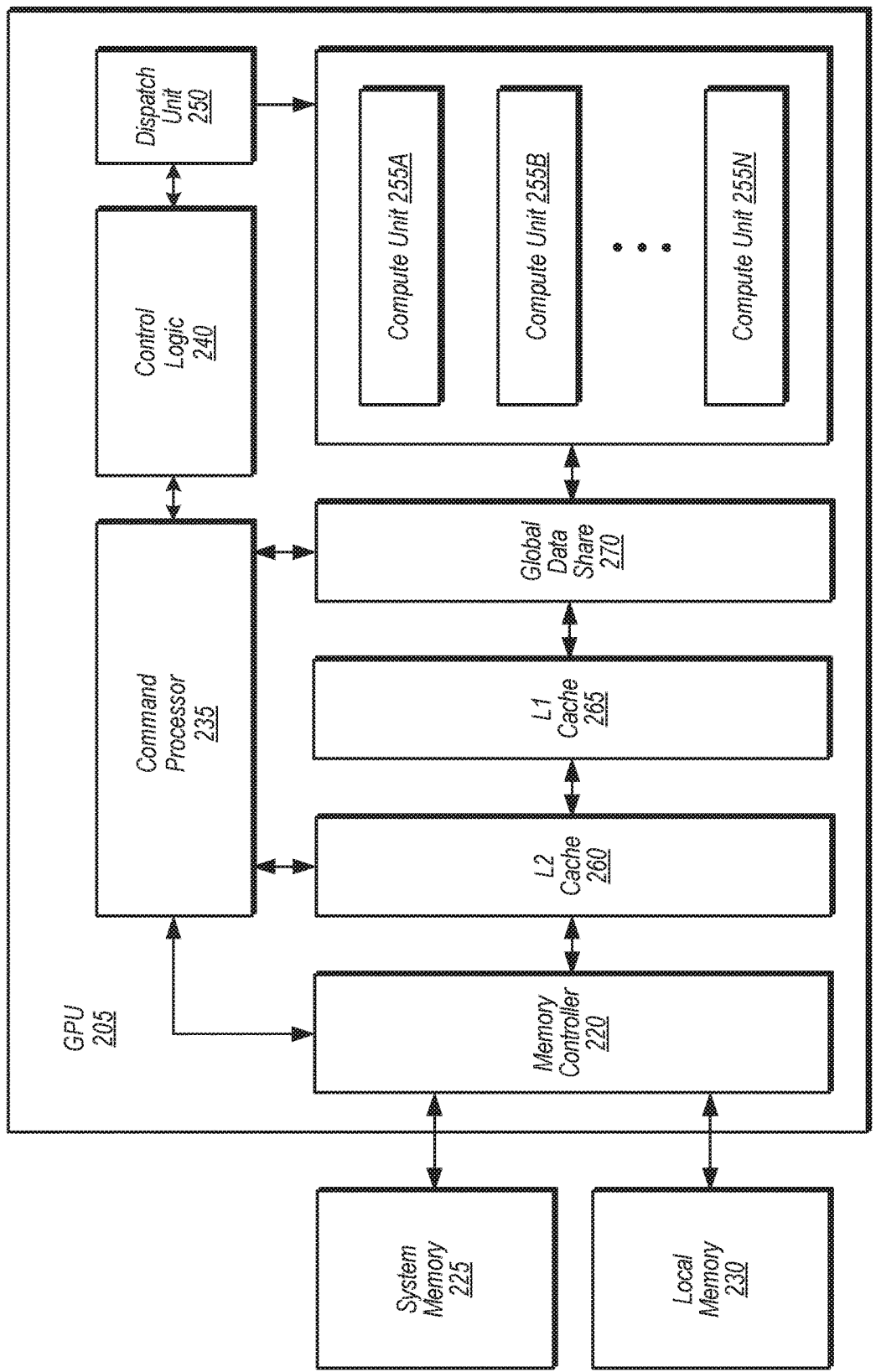
FIG. 2 is a block diagram of another implementation of a computing system.

Turning now to FIG. 2, a block diagram of another implementation of a computing system 200 is shown. In one implementation, system 200 includes GPU 205, system memory 225, and local memory 230. System 200 can also include other components which are not shown to avoid obscuring the figure. GPU 205 includes at least command processor 235, control logic 240, dispatch unit 250, compute units 255A-N, memory controller 220, global data share 270, level one (L1) cache 265, and level two (L2) cache 260. In other implementations, GPU 205 includes other components, omits one or more of the illustrated components, has multiple instances of a component even if only one instance is shown in FIG. 2, and/or is organized in other suitable manners. In one implementation, the circuitry of GPU 205 is included in processor 105N (of FIG. 1).

In various implementations, computing system 200 executes any of various types of software applications. As part of executing a given software application, a host CPU (not shown) of computing system 200 launches work to be performed on GPU 205. In one embodiment, command processor 235 receives draw calls from the host CPU, and command processor 235 uses dispatch unit 250 to issue draw calls to compute units 255A-N. In response to initiating a draw call for a given meshlet, the compute units 255A-N invoke a depth culling function for the given meshlet to determine whether to cancel, modify, or execute the draw call for the given meshlet. The given meshlet can include any number of vertices. More details on these and other techniques will be provided throughout the remainder of this disclosure.

Figure 3:
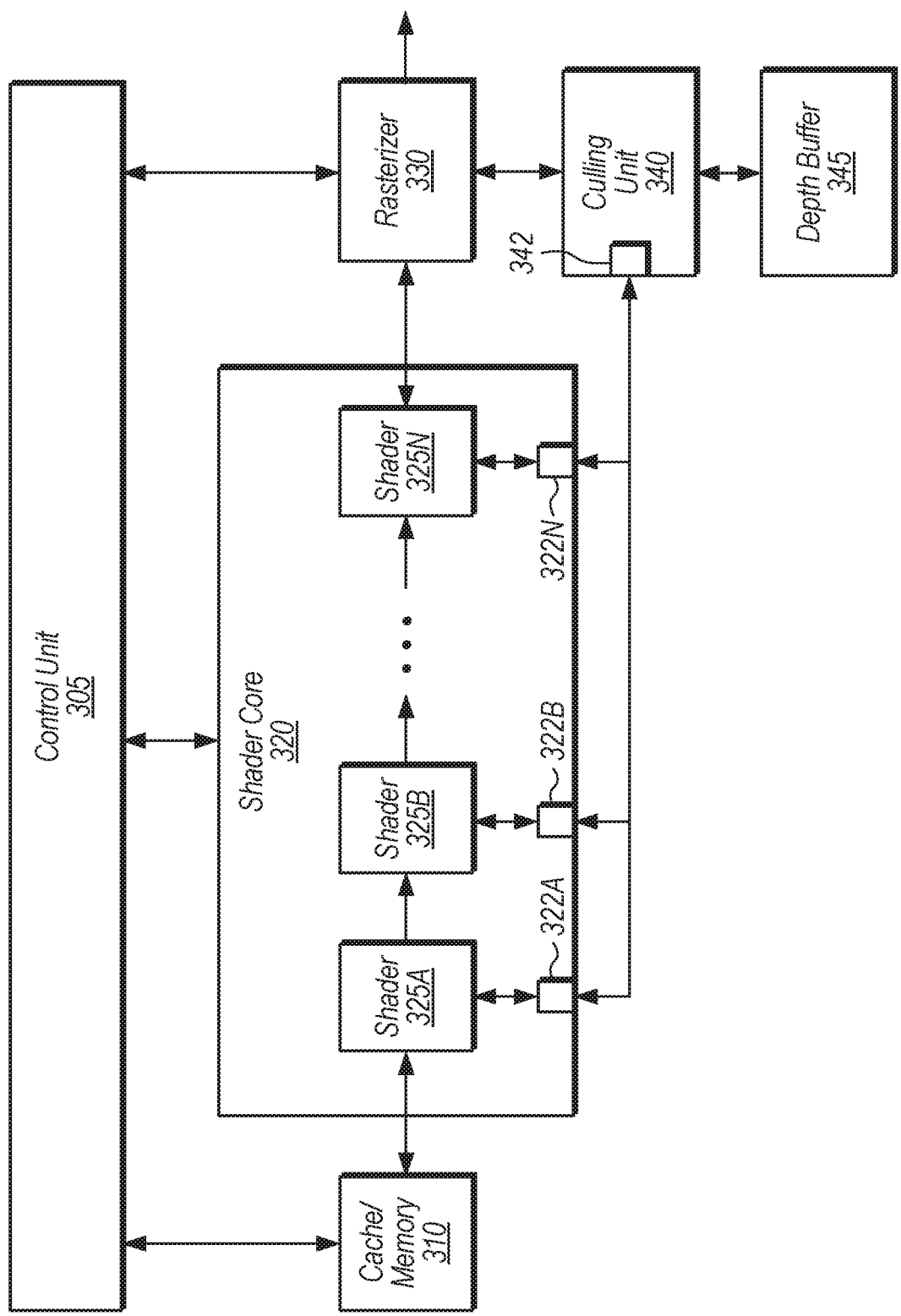
FIG. 3 is a block diagram of another implementation of a computing system.

Referring now to FIG. 3, a block diagram of another implementation of a computing system 300 is shown. In one implementation, computing system 300 includes at least control unit 305, cache/memory subsystem 310, shader core 320, rasterizer 330, culling unit 340, and depth buffer 345. Control unit 305 coordinates the processing performed by the various units of system 300 as part of rendering one or more frames or one or more portions of a frame. Control unit 305 can be implemented using any suitable combination of software and/or hardware. It is noted that control unit 305 can also be referred to as control logic 305. Also, portions of control unit 305 can be located within shader core 320 and culling unit 340 and portions of control unit 305 can be located external to shader core 320 and culling unit 340. Any suitable arrangement of the logic of control unit 305 spread throughout system 300 can be implemented. Computing system 300 can include any number of other components (e.g., memory device, frame buffer, display) which are not shown to avoid obscuring the figure.

Shader core 320 includes any number of shader units 325A-N, from 1 to N, where N is a positive integer greater than 1. It is noted that shader units 325A-N can also be referred to as shader stages 325A-N. Shader units 325A-N can include any number and type of shaders such as a vertex shader, a hull shader, a tesselator, a light shader, a pixel shader, a geometry shader, a mesh shader, an amplification shader, a domain shader, a fragment shader, a compute shader, and so on. Different shader cores 320 in different implementations can have different combinations and arrangements of individual shader units 325A-N. Shader core 320 can also be referred to herein as shader pipeline 320. Additionally, culling unit 340 can also be referred to herein as depth culling unit 340.

In one implementation, control unit 305 issues a draw call to shader core 320 for one or more primitives. In response to receiving the draw call, shader core 320 retrieves the corresponding primitives from cache/memory subsystem 310. In one implementation, shader core 320 executes an instruction to access culling unit 340 during the draw call. In one implementation, the instruction accesses a given interface 322A-N from the corresponding shader 325A-N of shader core 320. While multiple interfaces 322A-N are shown, these are intended to represent that the culling unit 340 is accessible from any shader 325A-N. In other words, interfaces 322A-N can actually consist of a single interface in some implementations. Also, culling unit 340 includes interface 342 to receive the instruction and corresponding parameters from shader core 320.

The instruction executed by shader core 320 allows shader core 320 to query culling unit 340 to perform a culling test during the shading process. In one implementation, the query includes one or more parameters associated with one or more primitives. In another implementation, the query includes parameters which define a screen-space rectangle with extents. In one implementation, in response to receiving the query, culling unit 340 executes a culling function by accessing depth buffer 345. It is noted that the depth buffer 345 being accessed in response to the instruction(s) executed by shader core 320 is the live depth buffer 345 rather than a copy of the actual depth buffer. Depth buffer 345 can be stored in a cache, in a memory, or in another location.

In one implementation, culling unit 340 returns the results of the culling function to shader core 320, and shader core 320 determines whether and/or how to proceed with the draw call based on the results of the culling function. For example, in one implementation, if the culling unit 340 returns an indicator to shader core 320 that a primitive should not be culled, then shader core 320 continues with the draw call for the primitive. After completing the draw call for the primitive, shader core 320 exports geometry to rasterizer 330 which generates shaded pixels for the frame buffer (not shown). In another implementation, rasterizer 330 conveys pixels back to shader core 320 for additional processing. If the culling unit 340 returns an indicator to shader core 320 that a given primitive is occluded, then shader core 320 cancels the draw call for the given primitive. It is noted that shader core 320 can issue overlapping culling requests to culling unit 340 and have multiple pending culling requests. Shader core 320 tracks the plurality of outstanding culling requests which have been sent to the depth culling unit prior to receiving responses to these requests. Once a response has been received for a given culling request, the given culling request is retired by shader core 320.

Figure 4:
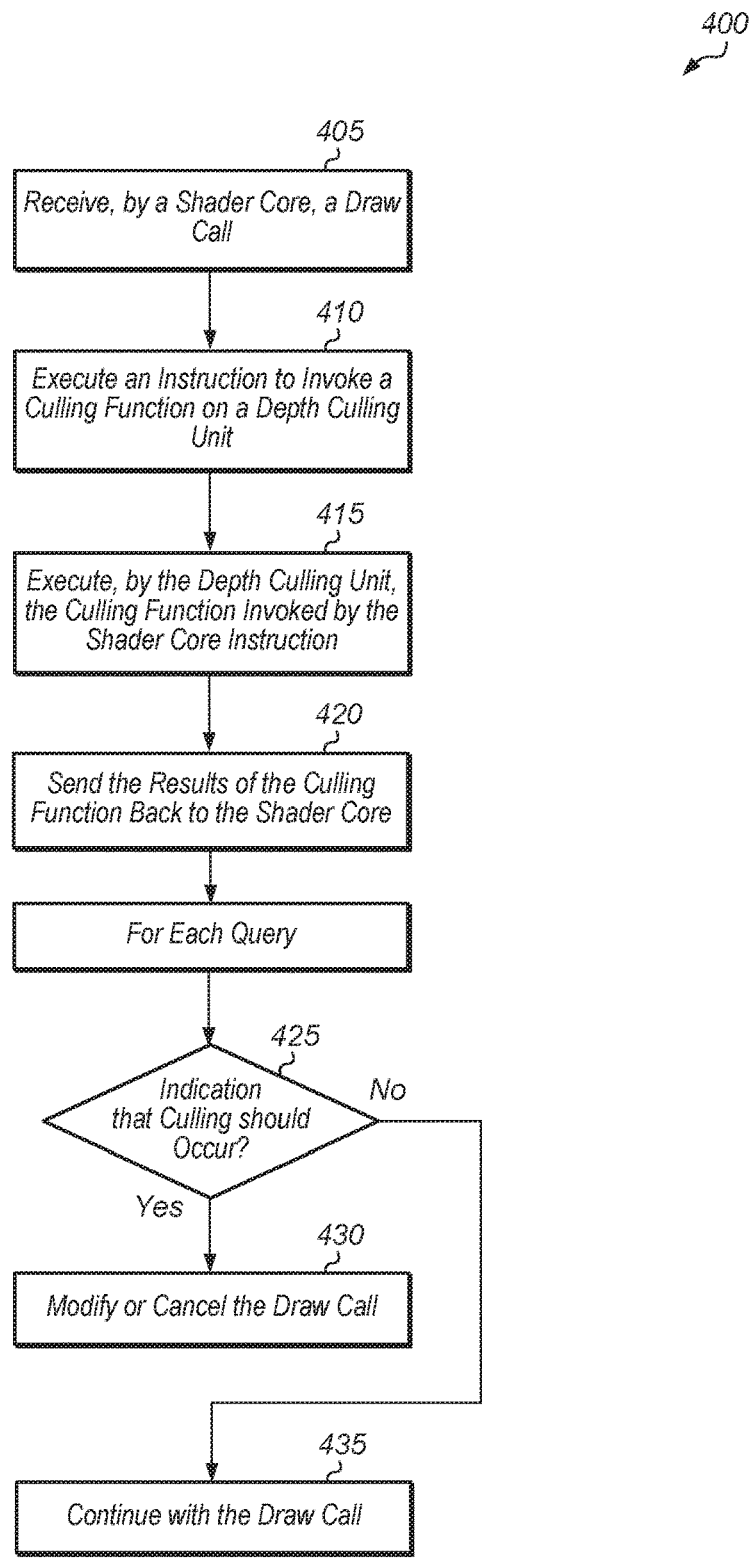
FIG. 4 is a generalized flow diagram illustrating one implementation of a method for executing a shader core instruction to invoke depth culling.
Figure 5:
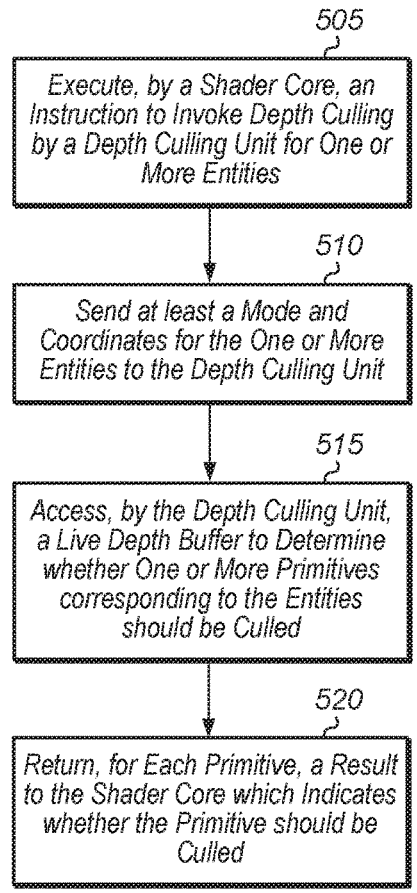
FIG. 5 is a generalized flow diagram illustrating one implementation of a method for executing a shader core instruction to invoke depth culling.
Figure 6:
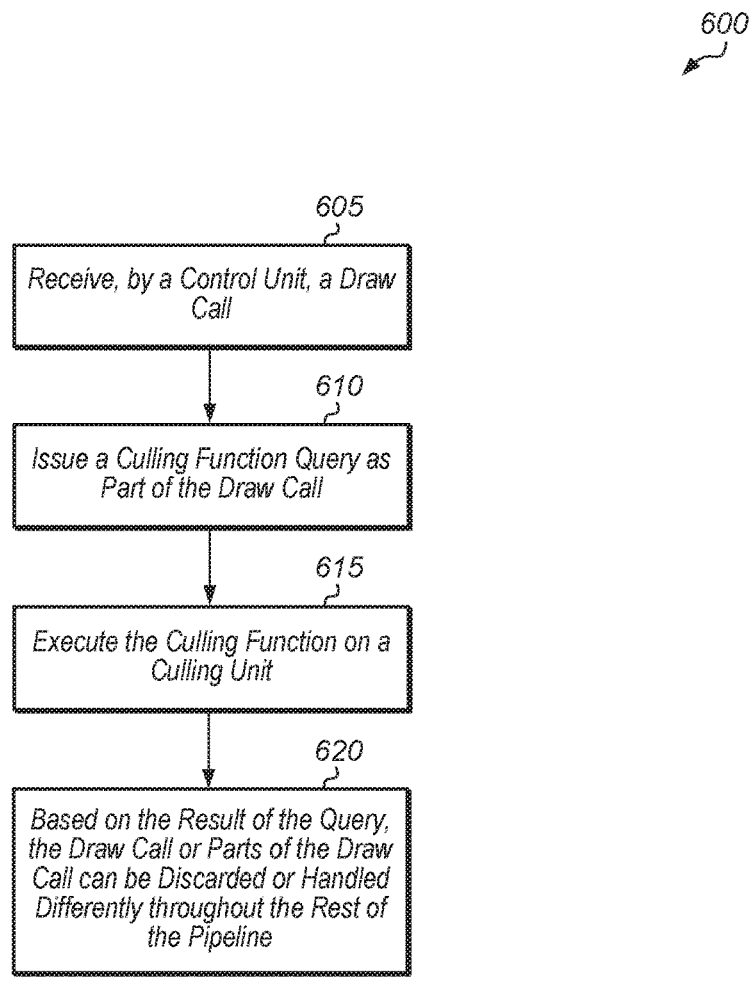
FIG. 6 is a generalized flow diagram illustrating one implementation of a method for converting a draw call into a culling function query.
Figure 7:
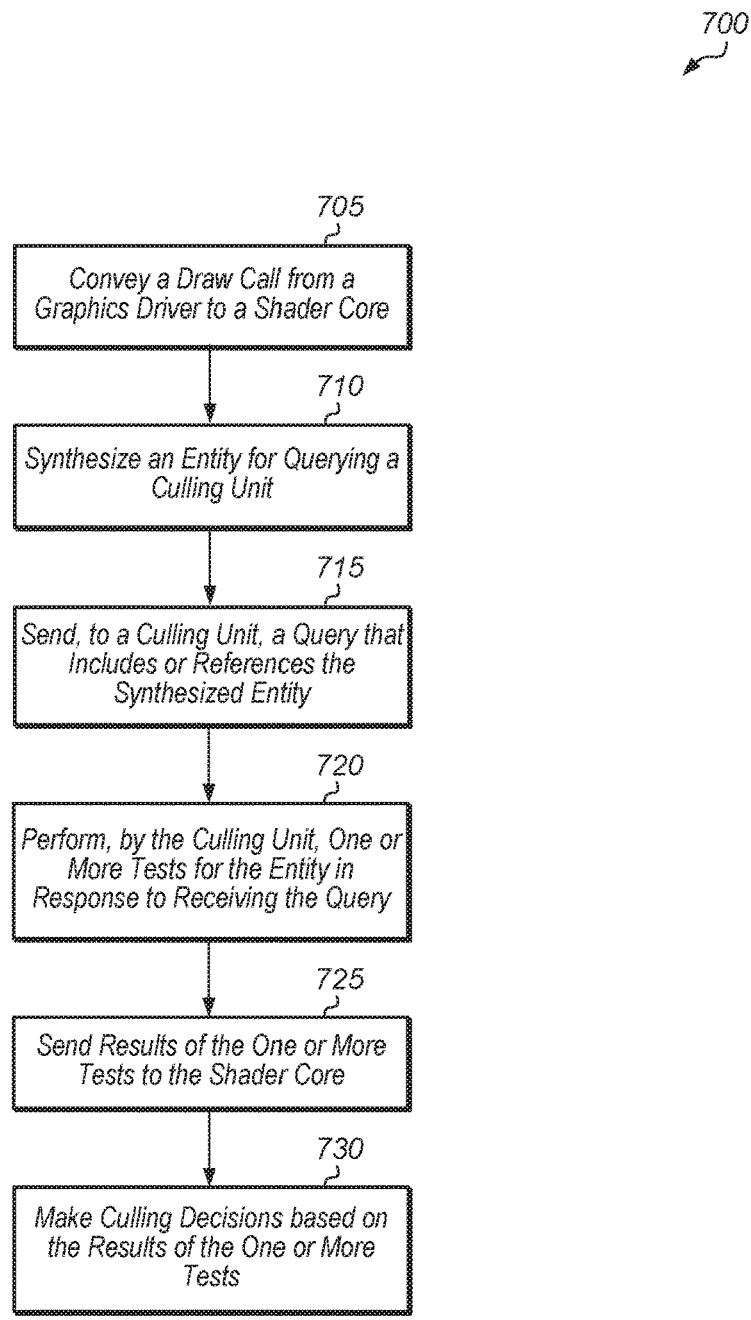
FIG. 7 is a generalized flow diagram illustrating one implementation of a method for synthesizing an entity when generating a query for a culling unit.

Turning now to FIG. 4, one implementation of a method 400 for executing a shader core instruction to invoke depth culling is shown. For purposes of discussion, the steps in this implementation and those of FIG. 5-7 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 400.

A draw call is received by a shader core (block 405). In one implementation, the draw call is for one or more primitives, or portions thereof. After receiving the draw call, the shader core executes an instruction to invoke a culling function on a depth culling unit (block 410). Next, the depth culling unit executes the culling function invoked by the shader core instruction (block 415). In one implementation, the culling function determines whether pixels, sub-pixels, fragments, or other portions of a primitive are closest to the observer or are hidden by previously rendered pixels of another primitive. It is noted that a "culling function" can also be referred to as a "depth test" or as an "occlusion culling function". In other implementations, other culling functions such as frustum culling, backface culling, small primitive culling, depth bound culling, or functions for executing other types of culling operations can be employed. Generally speaking, a "culling function" is defined as a process for removing or dropping a primitive from subsequent shading operations if it is determined that the primitive will have no effect or a relatively small effect (e.g., will not be visible) on the final image presented to the user.

Next, the depth culling unit sends the results of the culling function back to the shader core (block 420). For each query, if the depth culling unit indicates that culling should occur (conditional block 425, "yes" leg), then the shader core modifies or cancels the draw call (block 430). The shader core can also discard any primitives associated with the draw call in block 430. This helps to reduce the number of primitives that travel through and are processed by the shader core. Otherwise, if the depth culling unit indicates that culling should not occur (conditional block 430, "yes" leg), then the shader core continues with the draw call (block 435). It is noted that the depth culling unit can update the depth buffer for those screen pixels which have new depth values based on any visible primitives. After blocks 430 and 435, method 400 ends.

Referring now to FIG. 5, one implementation of a method 500 for executing a shader core instruction to invoke depth culling is shown. A shader core executes an instruction to invoke depth culling by a depth culling unit for one or more entities (e.g., primitives, screen-space rectangle) (block 505). As part of executing the instruction, the shader core sends at least a mode and coordinates for the one or more entities to the depth culling unit (block 510). For example, in one implementation, the shader core instruction includes the following parameters which are passed to the depth culling unit: geometry_cull_quad <output>, <screen min XY>, <screen max XY>, <depth min>, <depth max>. In another implementation, the shader core instruction includes the following parameters which are passed to the depth culling unit: geometry_cull_triangle <output>, <vertex 0 XYZ>, <vertex 1 XYZ>, <vertex 2 XYZ>. In other implementations, the shader core instruction includes other parameters and/or is formatted in other suitable manners.

Next, the depth culling unit accesses a live depth buffer to determine whether one or more primitives corresponding to the entities are occluded (block 515). Then, the depth culling unit returns, for each primitive, a result (e.g., Boolean result, coverage result) to the shader core which indicates whether the primitive should be culled (block 520). In one implementation, the depth culling unit returns a partially covered value which is useful to select a different level-of-detail. This could occur if a primitive is mostly hidden, for example. After block 520, method 500 ends. In one implementation, the shader core will use the result(s) provided by the depth culling unit to determine whether to modify, cancel, or continue with draw calls for the one or more primitives.

Turning now to FIG. 6, one implementation of a method 600 for converting a draw call into a culling function query is shown. A draw call is received by control unit (e.g., control unit 305 of FIG. 3) (block 605). The control unit can be implemented using any suitable combination of hardware and/or software. In response to receiving the draw call, the control unit issues a culling function query as part of the draw call (block 610). Next, the culling function is executed on a culling unit (e.g., culling unit 340 of FIG. 3) (block 615). Based on the result of the query, the draw call or parts of the draw call can be discarded or handled differently throughout the rest of the pipeline (block 620). In other words, if the result of the culling function indicates that one or more primitives (or portions thereof) should be culled or handled differently, then the shader core modifies the draw call accordingly for the one or more primitives. For example, an amplification shader can cancel a part of a draw call based on the result of the culling query. In another example, a mesh shader can discard individual primitives based on the result of the culling query. Otherwise, if the result of the culling query indicates that the primitive(s) should not be culled, then the draw call is executed in unmodified form by the shader core for the primitive(s). After block 620, method 600 ends.

Referring now to FIG. 7, one implementation of a method 700 for synthesizing an entity when generating a query for a culling unit is shown. A draw call is conveyed from a graphics driver to a shader core (block 705). In one embodiment, a "draw call" is defined as a request to render one or more primitives, with the request being compatible with a graphics application programming interface (API). Next, the shader core synthesizes (i.e., computes) an entity for querying a culling unit (block 710). In one embodiment, the entity is a screen-space rectangle with extents. For example, in one embodiment, an amplification shader synthesizes a screen-space bounding box that encapsulates one or more primitives referenced by the draw call. Then, the shader core sends a query to a culling unit, where the query includes or references the entity synthesized by the shader core (block 715). In one implementation, when the entity is a screen-space bounding box, the query specifies the minimum and maximum values of the screen-space bounding box.

The culling unit performs one or more tests for the entity in response to receiving the query (block 720). For example, in one implementation, when the entity defined by the query is a primitive, the culling unit checks the primitive against a Z-plane (i.e., depth plane). In another implementation, when the entity defined by the query is a screen-space rectangle, the culling unit checks the rectangle against a hierarchical tile (HTile). The HTile stores depth information for a block of pixels (e.g., 8×8 pixel block). Next, the culling unit sends results of the one or more tests to the shader core (block 725). Then, the shader core makes culling decisions based on the results of the one or more tests (block 730). For example, in one implementation, the shader core makes a decision on whether to modify a portion or the entirety of the draw call based on the results received from the culling unit. In one implementation, a compute shader could decide to stop the whole draw call when doing indirect draws based on the results. In another implementation, a geometry, hull, amplification, or compute shader could cull individual primitives. In a further implementation, a geometry, hull, or amplification shader could decide to produce fewer or no primitives. For example, in this implementation, if the shader is rendering a terrain tile which is identified as being covered by a threshold amount (e.g., 90%), then an approximation is performed using a relatively small number of triangles instead of generating a full mesh. In other implementations, other ways of responding to the culling unit results are possible and are contemplated. After block 730, method 700 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   an interface; and
   a pipeline comprising:
      a shader core configured to convey an output;
      a rasterizer, following the shader core in the pipeline, configured to receive the output from the shader core; and
      a culling unit coupled to the rasterizer;
   wherein the shader core is configured to:
      receive a draw call;
      in response to the draw call:
         execute an instruction to generate a culling function query;
         convey the culling function query to the culling unit;
         receive a response to the culling function query from the culling unit; and
         determine whether to cancel, continue, or modify the draw call based on the response received from the culling unit.

2. The apparatus as recited in claim 1, wherein the culling unit is configured to execute the culling function to access a live depth buffer in response to the query.

3. The apparatus as recited in claim 2, wherein the culling unit is configured to execute the culling function on an entity synthesized by the shader core.

4. The apparatus as recited in claim 1, wherein the response comprises a Boolean value or a coverage value.

5. The apparatus as recited in claim 1, wherein the shader core is further configured to provide a mode and coordinates to the culling unit as a result of executing the instruction.

6. The apparatus as recited in claim 1, wherein the shader core comprises a mesh shader which executes the instruction.

7. The apparatus as recited in claim 1, wherein the shader core is further configured to track a plurality of outstanding culling requests which have been sent to the culling unit.

8. A method comprising:
   receiving, by a shader core, a draw call;
   in response to receiving the draw call:
      executing, by the shader core, an instruction to generate a culling function query;
      conveying, from the shader core, the culling function query to a culling unit for the draw call, wherein the culling unit is in a pipeline subsequent to the shader core;
      receiving a response to the culling function query from the culling unit;
      determining whether to cancel, continue, or modify the draw call based on a response to the query received from the culling unit via an interface;
   conveying, from the shader core to a rasterizer following the shader core in the pipeline, data corresponding to rendered primitives.

9. The method as recited in claim 8, further comprising the culling unit executing the culling function to access a live depth buffer in response to the query.

10. The method as recited in claim 9, further comprising the culling unit executing the culling function on an entity synthesized by the shader core.

11. The method as recited in claim 8, wherein the response comprises a Boolean value or a coverage value.

12. The method as recited in claim 8, further comprising the shader core providing a mode and coordinates to the culling unit as a result of executing the instruction.

13. The method as recited in claim 8, further comprising a mesh shader executing the instruction.

14. The method as recited in claim 8, further comprising the shader core tracking a plurality of outstanding culling requests which have been sent to the culling unit.

15. A system comprising:
a culling unit;
a rasterizer; and
a shader core, preceding the culling unit in a pipeline, configured to:
convey, via a first interface, data corresponding to rendered primitives to the rasterizer;
receive a draw call;
in response to receipt of the draw call:
execute an instruction to generate a culling function query;
convey the culling function query to the culling unit via a second interface different from the first interface; and
determine whether to cancel, continue, or modify the draw call based on a response to the query received from the culling unit via the second interface.

16. The system as recited in claim 15, wherein the culling unit is configured to execute the culling function to access a depth buffer in response to the query.

17. The system as recited in claim 16, wherein the culling unit is configured to execute the culling function on an entity synthesized by the shader core.

18. The system as recited in claim 15, wherein response comprises a Boolean value or a coverage value.

19. The system as recited in claim 15, wherein the shader core is further configured to provide a mode and coordinates to the culling unit as a result of executing the instruction.

20. The system as recited in claim 15, wherein the shader core is further configured to track a plurality of outstanding culling requests which have been sent to the culling unit.

* * * * *